(12) United States Patent
Becherucci et al.

(10) Patent No.: US 6,849,964 B2
(45) Date of Patent: Feb. 1, 2005

(54) WIND POWERED ENERGY GENERATING MACHINE

(75) Inventors: Raffaele Becherucci, Florence (IT); Gianfranco Stratico, Siena (IT); Federico Guidi, Pisa (IT)

(73) Assignee: Axis USA, Inc., Tampa, FL (US)

(*) Notice: Subject to any disclaimer, the term of this patent is extended or adjusted under 35 U.S.C. 154(b) by 0 days.

(21) Appl. No.: 10/661,762

(22) Filed: Sep. 11, 2003

(65) Prior Publication Data

US 2004/0100103 A1 May 27, 2004

Related U.S. Application Data

(60) Provisional application No. 60/410,782, filed on Sep. 13, 2002.

(51) Int. Cl.[7] .................................................. F03D 3/04
(52) U.S. Cl. ............................ 290/55; 290/43; 290/45; 290/42
(58) Field of Search ............................. 290/55, 44, 45, 290/43; 415/4.2, 4.5

(56) References Cited

U.S. PATENT DOCUMENTS

| | | | | |
|---|---|---|---|---|
| 5,375,968 A | | 12/1994 | Kollitz et al. ................. | 415/2.1 |
| 5,852,331 A | * | 12/1998 | Giorgini ....................... | 290/55 |
| 6,177,735 B1 | * | 1/2001 | Chapman et al. ............. | 290/44 |
| 6,417,578 B1 | * | 7/2002 | Chapman et al. ............. | 290/44 |
| 6,465,899 B2 | * | 10/2002 | Roberts ....................... | 290/44 |

* cited by examiner

*Primary Examiner*—Nicholas Ponomarenko
*Assistant Examiner*—Iraj A. Mohandesi
(74) *Attorney, Agent, or Firm*—Fish & Neave LLP

(57) ABSTRACT

A machine for generating usable energy from a wind source is provided. The machine includes a casing structure that may define an air inlet oriented with respect to a prevailing wind direction and an air outlet. The casing structure may be substantially cylindrical. A rotor having a blade structure is positioned within the casing structure and has a substantially vertical axis of rotation. The casing structure may include two side passages for creating a zone of low pressure downstream of the rotor near the air outlet.

13 Claims, 4 Drawing Sheets

WIND POWERED ENERGY GENERATING MACHINE

This application claims the benefit of U.S. provisional patent application No. 60/410,782, filed Sep. 13, 2002.

BACKGROUND OF THE INVENTION

This invention relates to a machine for generating energy from a wind source. More particularly, this invention relates to a machine having a rotor that is caused to rotate around a vertical axis by a wind source. The rotor may be coupled to a dynamo-electric generator in order to produce electric power for downstream consumption.

Currently, machines for generating energy from wind sources can include large wind turbines mounted at wind sites, along with various deflectors placed upstream of the turbine. Such arrangements can be difficult to install at the wind sites, as the placement of the various deflectors can be complex. In addition, such an arrangement can be unaesthetic and can lessen the beauty of the landscape at the wind site.

Accordingly, it would be desirable to provide a machine for generating energy from a wind source having a casing structure within which a rotor having a vertical axis of rotation is positioned.

SUMMARY OF THE INVENTION

In accordance with the present invention, a machine for generating energy from a wind source is provided having a casing structure within which a rotor having a vertical axis of rotation is positioned.

The solutions of the present invention simplify the construction process of the machinery and its installation at a wind site. Furthermore, the machinery may be adjusted to optimize the power extraction from a wind source, and achieves a minimal ecological impact when installed at the wind site. The machinery is applicable for a wide range of power rating consumptions (e.g., from ratings of domestic applications to ratings of primary wind power stations).

In some embodiments of the present invention, the machine for generating usable energy from a wind source has a casing structure. A rotor having a blade structure is positioned within the casing structure and has a substantially vertical axis of rotation. The casing structure may define an air inlet upstream of the rotor that is oriented with respect to a prevailing wind direction and an air outlet downstream of the rotor. The casing structure may have a main passage through which air flows and interacts with the blade structure. The casing structure may have first and second side passages that are delimited by first and second sidewalls of the casing structure, respectively. The first and second side passages may converge toward one another near the air outlet forming a zone of low pressure downstream of the rotor.

Further features of the invention, its nature and various advantages will be more apparent from the accompanying drawings and the following detailed description.

DETAILED DESCRIPTION OF THE INVENTION

Figure 1:
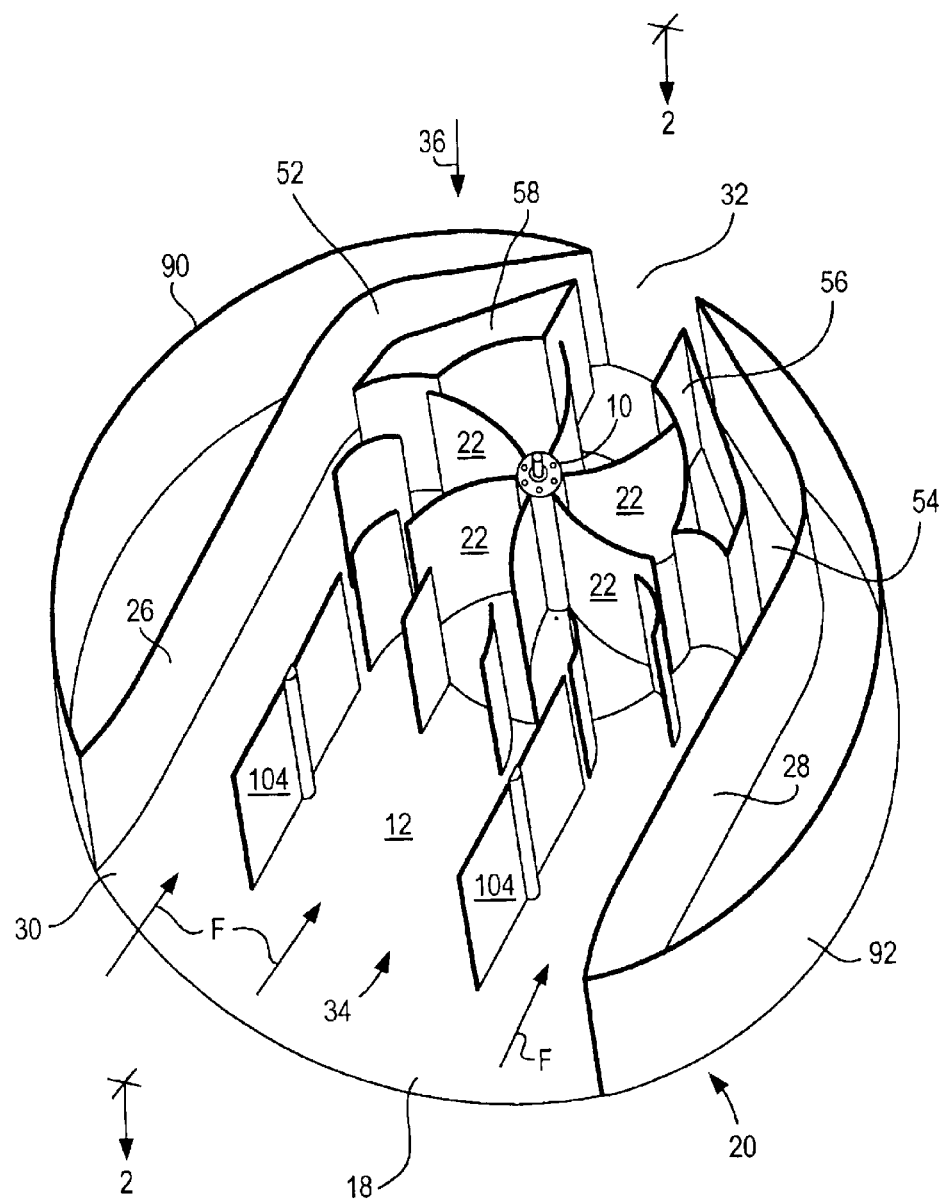
FIG. 1 is a partial perspective view of the energy generating machine of the present invention, with certain parts removed to show other parts that would otherwise be hidden.
Figure 2:
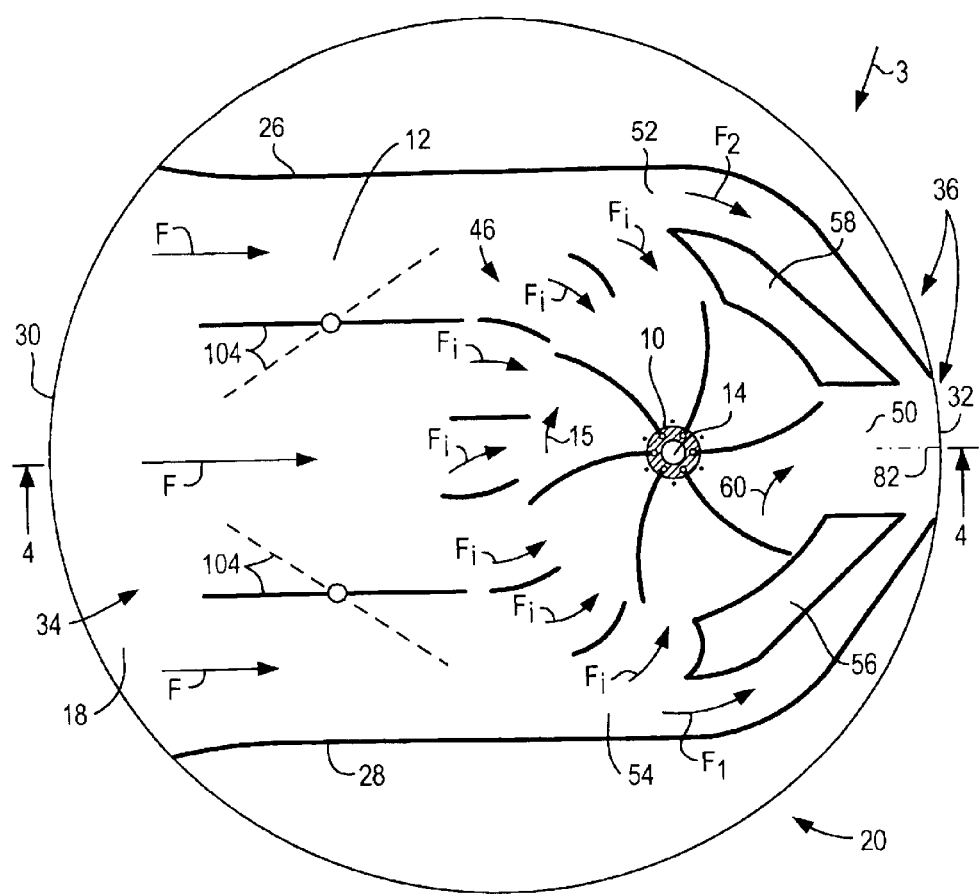
FIG. 2 is a view as seen from direction 2—2 of FIG. 1.
Figure 3:
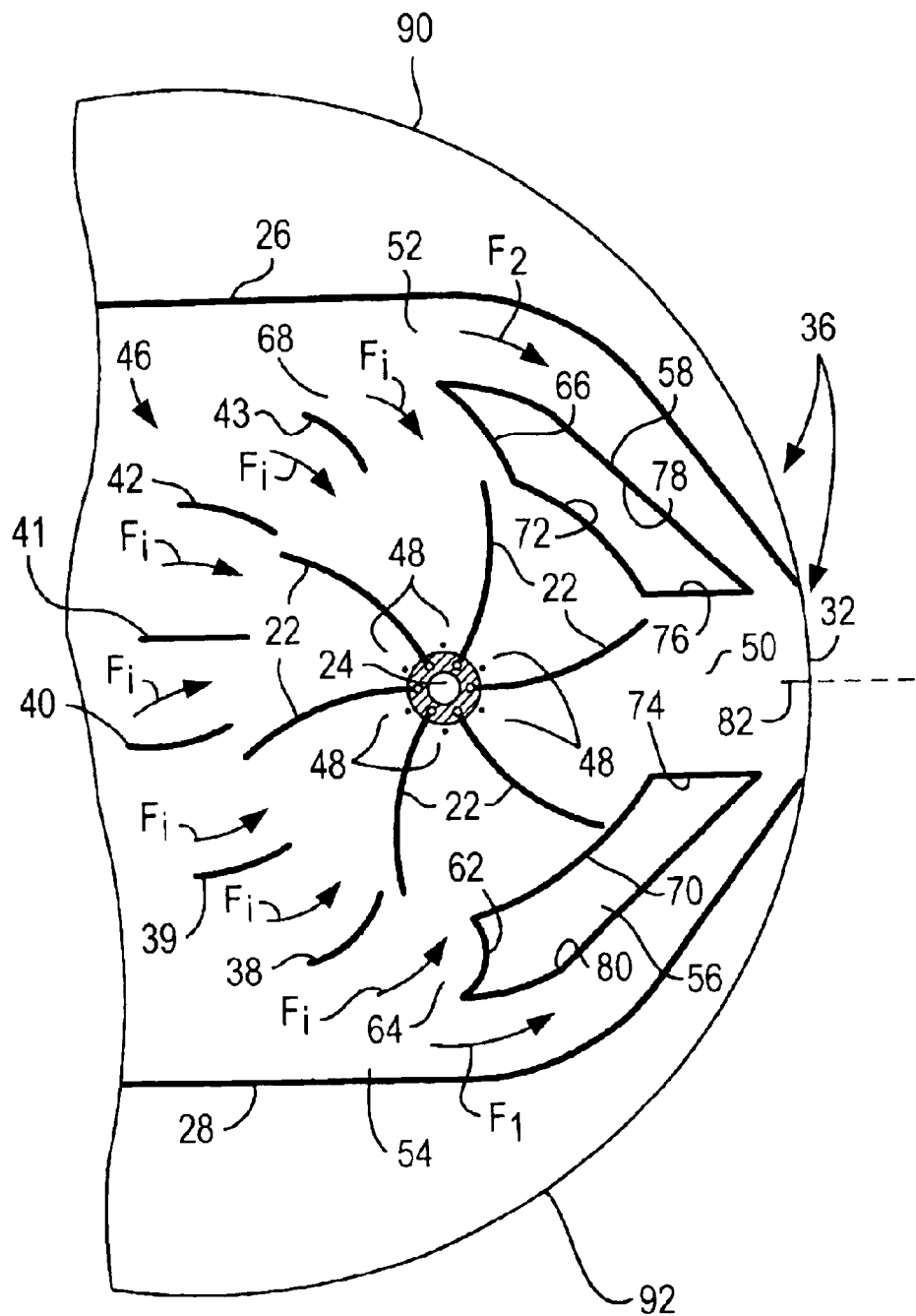
FIG. 3 is an enlargement of portion 3 of FIG. 2.

As shown in FIGS. 1–3, rotor 10 is located in passage 12 for rotation around vertical axis 14 in direction 15 when driven by a wind source (e.g., a natural wind source). Vertical axis 14 is substantially perpendicular to upper cover plate 16 and lower cover plate 18 of general casing structure 20. Upper cover plate 16 and lower cover plate 18 may be substantially horizontal, and therefore parallel to a ground plane that supports general casing structure 20. (In FIG. 1, upper cover plate 16 is not shown in order to show other parts of the machine that would otherwise be hidden.)

Rotor 10 may include a blade structure. In the example shown in the FIGS., the blade structure of rotor 10 includes a plurality of blades 22 that are cantilevered from rotation shaft 24. Blades 22 may be panels having a concave configuration, as shown in the FIGS. Blades 22 may have other configurations, such as a spiral shape, to increase the power extraction from the wind source. Passage 12 may be delimited laterally by opposite side walls 26 and 28 and vertically by upper and lower cover plates 16 and 18, respectively.

Side walls 26 and 28 extend from inlet opening 30 of passage 12 to outlet opening 32 of passage 12. Side walls 26 and 28 may be substantially parallel to each other in portion 34 of passage 12, while sidewalls 26 and 28 may converge towards each other in portion 36 of passage 12. Inlet opening 30 faces a prevailing wind direction in order to collect and achieve air flow F in portion 34 of passage 12.

In portion 34, the path of air flow F is initially parallel to sidewalls 26 and 28. Air flow deflector members, consisting of upstanding panels 38–43, are spaced apart at predetermined positions in portion 34 in order to partially surround rotor 10 along a circular sector 46. Portions $F_i$ of air flow F are deflected by panels 38–43, thereby causing the air particles of flow F to fill compartments 48 of the rotor. Compartments 48 are delimited by blades 22 and upper and lower cover plates 16 and 18, respectively. The configurations of panels 38–43 (shown as both concave and straight in the FIGS.), and their orientation, cause the air particles to impinge on the surfaces of blades 22 at predetermined angles. The predetermined angles influence the resultant driving force achieved on rotor 10 by the wind source. The air particles that enter compartments 48 rotate with rotor 10 and run along blades 22 until they are discharged through passage 50. Thus, the air particles lose their quantity of motion or energy in order to drive rotor 10.

Narrow passages 52 and 54, which are respectively delimited by sidewalls 26 and 28, are on opposite sides of the circular sector 46 occupied by panels 38–43. Upper and lower cover plates 16 and 18, respectively, vertically delimit passages 52 and 54.

Upstanding casing structures 56 and 58 are located in another circular sector 60 surrounding rotor 10. Face 62 of casing structure 56, together with panel 38, form passage 64. Similarly, face 66 of casing structure 58, together with panel 43, form passage 68. Face 70 of casing structure 56 surrounds a portion of rotor 10. Similarly, face 72 of casing structure 58 surrounds another portion of rotor 10. Passage 50 is formed between face 74 and face 76. Face 78 and sidewall 26 complete narrow passage 52. Similarly, face 80 and sidewall 28 complete narrow passage 54. Preferably, passage 50 is centered on axis 82, and narrow passages 52 and 54 are spaced symmetrically apart with respect to axis 82, as shown in the FIGS.

By means of the described arrangement, portions of air flow F that have not entered rotor 10 (see portions of air flow F referenced as $F_1$ and $F_2$) will run through narrow passages 52 and 54 to create a low pressure region in portion 36. The low pressure region in portion 36 induces the extraction of air particles from rotor 10 through passage 50. The extraction occurs when a compartment 48 of rotor 10 is facing passage 50. The sectional size of passage 50 influences the average speed of the air particles when moving with rotor 10. More particularly, a restricted sectional size of passage 50, compared to the total sectional size of passages formed by panels 38–43 on sector 46, increases the average speed of the air particles rotating with rotor 10. The increase in the average speed of the air particles extracts more rotation power for rotor 10, which consequently increases the electric power that can be obtained for downstream consumption.

The low pressure region 36 extends beyond outlet opening 32 so that the air particles of flow F are ultimately discharged from passage 32.

Figure 4:
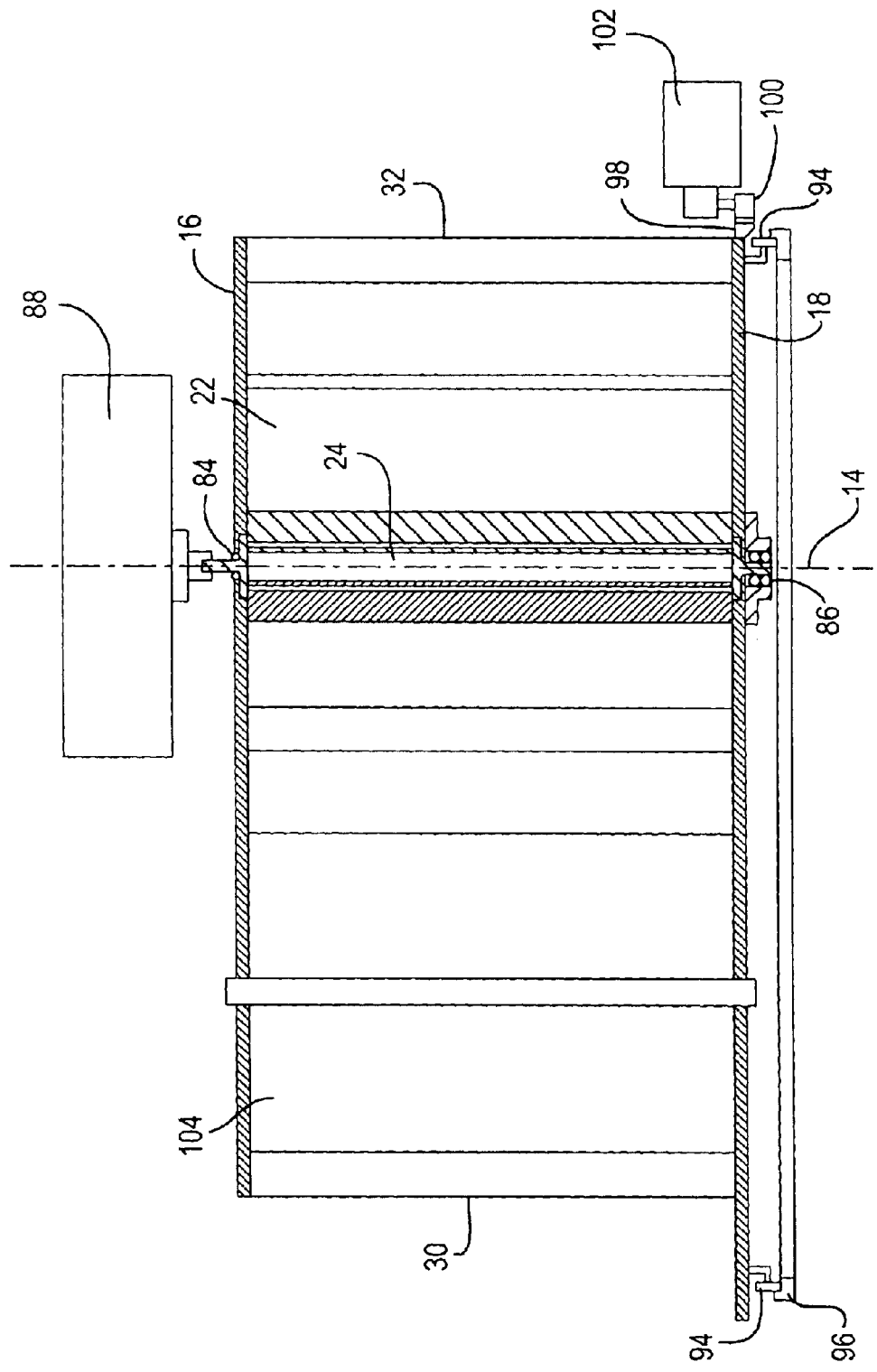
FIG. 4 is a sectional view as seen from direction 4—4 of FIG. 2, and which also shows the parts which have been removed in FIG. 1.

Rotor 10 is supported for rotation in direction 15 by supporting shaft 24 in bearings 84 and 86, seated in upper cover plate 16 and lower cover plate 18, respectively (see FIG. 4). Dynamo-electric generator 88 may be coupled to shaft 24, as shown in FIG. 4.

External plates 90 and 92, which have a cylindrical shape, surround side walls 26 and 28. As a result, general casing structure 20 has a homogenous cylindrical appearance to the external observer. In addition, the resulting cylindrical form of general casing structure 20 presents low disruption to air flow investing the entirety of general casing structure 20.

Lower case plate 18 may be provided with wheels 94, which may be supported and guided by ground rail 96. Ground rail 96 may be circular in order to rotate lower case plate 18 around a vertical axis of the machinery. Circular rack 98, which lines lower cover plate 18 and is concentric to the vertical axis of the machinery, may be engaged by pinion 100 of motor 102. By rotation of motor 102, general casing structure 20 may be rotated around the vertical axis of the machinery to orient inlet opening 30 with respect to a prevailing wind direction, thereby maximizing power extraction from the wind source.

The prevailing wind direction may be sensed by a wind direction sensor that supplies information signals which may be used by a control and regulation unit to drive motor 102, resulting in calculated rotations that orient inlet opening 30 with respect to the prevailing wind direction. The external cylindrical form of general casing structure 20 offers low air obstruction when rotating general casing structure 20 around the vertical axis of the machinery to orient inlet opening 30 with respect to the prevailing wind direction.

Limiting the power extraction from the wind source in situations of high wind speeds may be achieved by rotating baffles 104 towards each other to form a diverging passage for the air flow reaching and passing through rotor 10. A rotated position of baffles 104 is shown by the dashed lines in FIG. 2.

The inclusion of rotor 10 within general casing structure 20 greatly reduces the noise level that rotor 10 produces during rotation caused by the wind source. Furthermore, protection grids (not shown) may be installed across inlet opening 30 and outlet opening 32 to prevent humans and animals from entering passage 12. The protection grids would be visible and would present low air obstructions to the air flow F needed in passage 12.

Higher power ratings of the machinery may be achieved by increasing the overall sizes of rotor 10 and passage 12. The major increases in size can be in the diameter of rotor 10 and in the plan dimensions of passage 12. These alterations would result in a lower height of general casing structure 20 with respect to the height of traditional wind driven machinery having the same power rating. An increase of the power ratings can also be achieved by mounting multiple units, such as the unit shown in FIG. 4, one above the other in order to form a vertical column of small plan occupancy.

The machine of the present invention may be installed in various locations where it is desired to produce electric power from a wind source. For example, the machine of the present invention may be installed on a roof of a tall building in an urban setting, thereby taking advantage of the high winds present at such a height and making efficient use of available space.

Thus, a wind powered energy generating machine is provided. One skilled in the art will realize that the present invention can be practiced by other than the described embodiments, which are presented for purposes of illustration and not of limitation, and that the present invention is limited only by the claims which follow.

What is claimed is:

1. A machine for generating usable energy from a wind source, comprising:

a casing structure; and a rotor having a blade structure, wherein the rotor is positioned within the casing structure, wherein the rotor has a substantially vertical axis of rotation, and wherein the casing structure defines an air inlet upstream of the rotor that is oriented with respect to a prevailing wind direction and an air outlet downstream of the rotor, and wherein the casing structure has:

a main passage, wherein air flows through the main passage and interacts with the blade structure; and first and second side passages, wherein the first and second side passages are delimited by first and second sidewalls of the casing structure, respectively, and wherein the first and second side passages converge toward one another near the air outlet forming a zone of low pressure downstream of the rotor.

2. The machine of claim 1, wherein the casing structure has an outer surface that is substantially cylindrical.

3. The machine of claim 1, wherein the blade structure comprises a plurality of blades spaced circumferentially apart around the axis of rotation of the rotor.

4. The machine of claim 1, further comprising:

lower and upper cover plates, wherein the lower and upper cover plates vertically delimit the main passage and the first and second side passages.

5. The machine of claim 1, further comprising:

lower and upper cover plates, wherein the lower and upper cover plates are substantially perpendicular to the axis of rotation of the rotor, and wherein the lower and upper cover plates vertically delimit the main passage and the first and second side passages.

6. The machine of claim 1, further comprising:

a plurality of baffles, wherein the plurality of baffles are mounted within the casing structure upstream of the rotor, and wherein each baffle of the plurality of baffles has a substantially vertical axis of rotation.

7. The machine of claim 1, further comprising:

a plurality of panels, wherein the plurality of panels are mounted within the casing structure upstream of the rotor, and wherein the plurality of panels are spaced apart from one another and partially surround a portion of the rotor.

8. The machine of claim 1, further comprising:

first and second side passage structures, wherein the first and second side passage structures partially surround a portion of the rotor, and wherein the first and second side passages are further delimited by the first and second side passage structures, respectively.

9. The machine of claim 1, further comprising:
an air inlet protection grid, wherein the air inlet protection grid is mounted across the air inlet.

10. The machine of claim 1, further comprising:
an air outlet protection grid, wherein the air outlet protection grid is mounted across the air outlet.

11. The machine of claim 1, further comprising:
means for rotating the casing structure about a vertical axis of the casing structure to orient the air inlet with respect to the prevailing wind direction.

12. The machine of claim 1, further comprising:
means for rotating the casing structure about a vertical axis of the casing structure to orient the air inlet with respect to the prevailing wind direction, the means for rotating comprising:
a ground rail; and
a plurality of wheels, wherein the wheels are mounted on the casing structure and engage the ground rail to rotate the casing structure about the vertical axis of the casing structure.

13. The machine of claim 1, further comprising:
a wind direction sensor, wherein the wind direction sensor senses the prevailing wind direction.

* * * * *